Oct. 27, 1936.  O. B. BRIGGS ET AL  2,058,767
BELT LACER
Filed Jan. 13, 1933
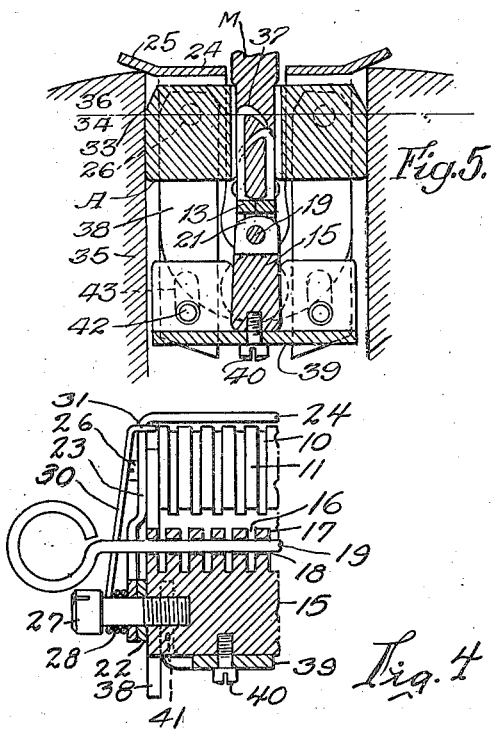
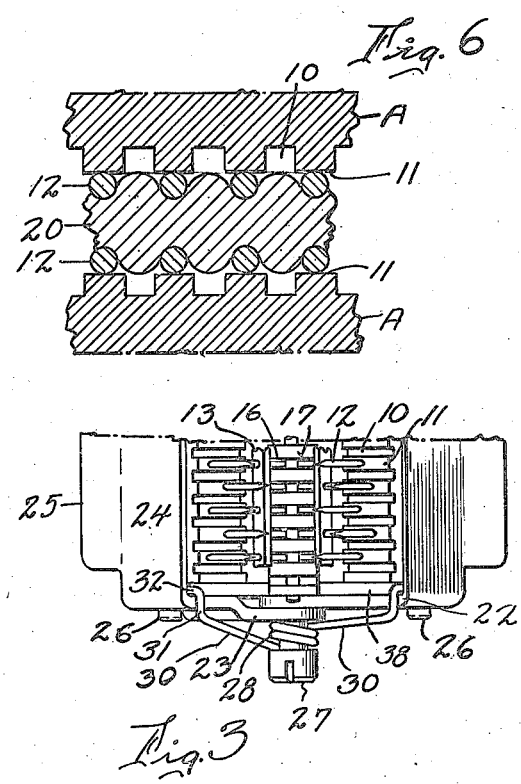
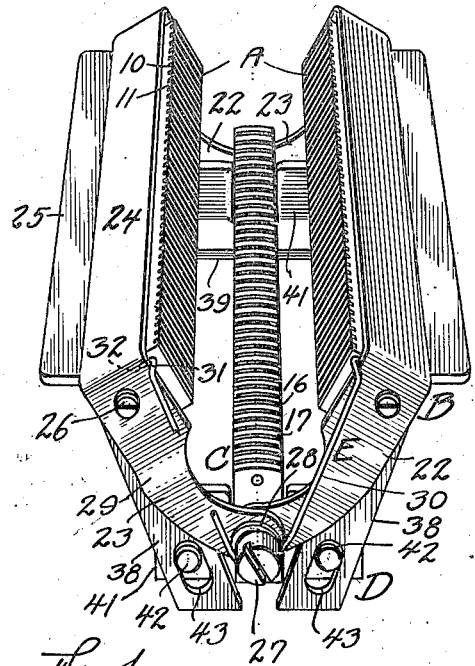
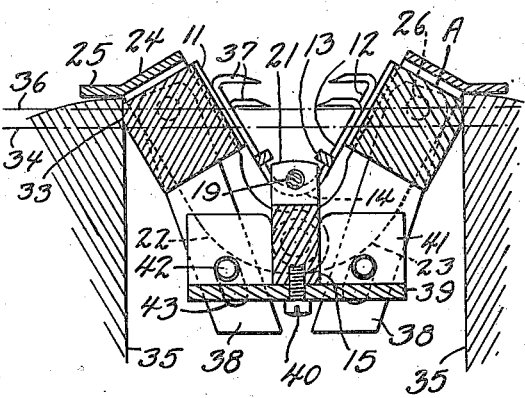
Inventor
Orville B. Briggs
Albert L. Lamb
Attorney Patented Oct. 27, 1936

2,058,767

UNITED STATES PATENT OFFICE 2,058,767

BELT LACER

Orville B. Briggs and Albert L. Lamb, Toledo, Ohio

Application January 13, 1933, Serial No. 651,576

12 Claims. (Cl. 1—49.4)

This invention relates to belt lacers generally, and particularly to that type of lacer which is adapted to be operated between the jaws of a bench vise or the like.

One object of the invention is to provide a lacer adapted, in seating a clip of hooks in a belt, to attain greater embedding of the hooks with less pressure than has been necessary in former devices of this character, whereby there is less bruising of the belt and the finished lacing job is smoother and capable of greater wear and endurance.

It is possible, by applying sufficient pressure to a leather belt, to squeeze out the contained oils which temper the leather, lubricate it, and give it resiliency and wearing qualities. It is of course desirable to avoid this result in lacing a belt, and the present invention aims to preserve to a maximum the natural pliancy and suppleness of the leather while embedding the hooks deeply in the body of the belt. This is attained by forming the working faces of the hook seating jaws with channelled depressions between the hook engaging portions of said faces, so that the leather is free to flow around the hooks without being compressed between the faces of the jaws. The invention contemplates, in the mechanism for achieving this result, a magazine that is so arranged with respect to the protruding hook engaging portions of the jaws that the hooks will be held in registry with said protruding portions.

In connection with a vise operated type of lacer, an object of the invention is to provide a relatively light, compact, simple, yet very sturdy and durable structure. The hook seating jaws are carried by arms which are pivoted together at the respective ends of the jaws to allow the jaws to approach each other. Sturdiness is attained primarily by forming the arms integrally with longitudinal bridge members which extend over the respective jaws, whereby each pair of arms and its connecting bridge constitutes a rigid yoke shaped member which may be and preferably is formed in a single piece.

Another object is to provide a lacer adapted to apply pressure to the hooks in such a manner as to seat the hooks to a uniform depth in the belt being laced. This is accomplished by applying greatest pressure to the hooks near their bends, the jaws being adapted to follow the inclination of the hooks as they are closed. To this end, the jaws are swingingly mounted on axes that remain above the plane of contact of the jaws by the vise jaws, pressure being applied generally just a little below the plane of the axes of the hook seating jaws, the latter plane and the plane of contact with the vise jaws approaching each other during closing movement, so that the center of pressure against the hooks will move toward the tips thereof during closing, to facilitate clinching.

Another object is to provide a lacer of the type having wings to rest upon the noses of the jaws of a vise for supporting the lacer, wherein the wings are unconnected to the hook seating jaws so that the latter may assume their proper positions conforming to the shape of a clip of hooks prior to application of pressure. This facilitates the use of the device. The result is secured by attaching the wings to the jaw supporting members, leaving the jaws hanging freely when the device rests in a vise. A preferable mode of construction is to form the wings as extensions of the aforementioned bridge member connecting the jaw supporting arms.

The invention further aims to provide means for centering the magazine relative to the jaws when the device is open. In the preferred embodiment, this centering means also serves as a means for limiting closing movement of the device.

An important object is to provide means for limiting the distance within which the hook seating jaws may approach each other, so that it will be impossible to crush the belt by too far closing of the device. This feature also includes means for rigidly centering the magazine at the end of the closing movement to insure accurate positioning of the axis of the hook loops in the medial plane of the belt.

Another object is to provide an arrangement wherein the magazine is supported on the same pivots which connect the jaw supporting arms, the pivots being preferably in the form of screws threaded into the ends of the magazine. The invention further contemplates spring means for opening the device, and a preferred form of spring is one which is looped about the aforesaid pivot and hooked around the jaw supporting arms.

The invention further aims to provide a magazine of which the hook supporting fingers have their upper ends arched to conform generally to the paths of movement of the connecting bars of the clip of hooks used in connection with the device, so that the said bars may move closely adjacent the upper edges of said fingers.

Another object is to provide a lacer having means for supporting itself on a flat surface. In its preferred form this feature embodies the extension of the guide arms forming part of the aforementioned means for centering the magazine, to form supporting legs.

Another object is to provide the combination of a serrated closing jaw having a plurality of spaced parallel ridgelike teeth, and any suitable means for holding a series of lacing hooks in registry with said teeth so that the hooks will be pressed into the belt being laced, by said teeth, the depressions between the teeth allowing the leather to flow past the faces of the teeth during the closing operation so as to insure embedding of the teeth flush with the surface of the belt, without crushing the material of the belt.

With these and other objects in view our invention consists in the combination and construction and arrangement of the various parts thereof, whereby the objects contemplated are attained, as more fully set forth in the accompanying specifications, pointed out in our claims, and illustrated in the accompanying drawing, in which:

Fig. 1 is a perspective view of the lacer.

Fig. 2 is a transverse sectional view through the lacer and adjacent portions of a vise in which the lacer is supported.

Fig. 3 is a plan view of an end portion of the lacer.

Fig. 4 is a longitudinal vertical sectional view through an end portion of the lacer.

Fig. 5 is a view similar to Fig. 2 showing the position of parts when the device is in closed position.

Fig. 6 is an enlarged sectional view through adjacent portions of opposed jaws of the device in relative positions nearing the end of the closing movement of the device, the belt and hooks being embedded thereing being illustrated in connection therewith.

The device may be divided into several main elements, as follows: The hook seating jaws A are carried by jaw supporting members B, in the form of yokes, swingingly attached to a magazine C, centered by the combined centering and movement limiting mechanism D, and the supporting yokes are urged toward open position by springs E.

The hook seating jaws (Fig. 6) have their working faces channelled with a plurality of spaced depressions 10, crossing said face transversely, protruding hook engaging faces 11 being formed between said channelled depressions 10. The spacing of the faces 11 is the same as the spacing of the belt hooks 12 in a clip of hooks such as that illustrated, wherein the hooks are held together by longitudinal bars 13 attached to the hooks near their bends 14. (It may be noted at this point that the bars rest closely adjacent the end of the belt in which the hooks are seated.) The magazine C comprises a bar 15 (Fig. 5) the upper region of which has the transversely milled hook receiving slots 16 forming the spaced hook supporting fingers 17, the latter having aligned openings 18 to receive a retaining pin 19 extended longitudinally through the magazine over the bends 14 of the hooks to securely hold the clip in place during seating.

The slots 16 are registered with the hook engaging faces 11 of the jaws A so as to hold the hooks 12 securely in registry with said faces during operation.

As will be seen from an inspection of Fig. 6, the channelled depressions 10 allow the leather of the belt 20 to be extruded freely past the hooks 12 without being compressed between the faces of the jaws A. Thus the only pressure suffered by the belt is that of the hooks themselves, which of course is unavoidable. It will be understood that because of the elasticity of the leather, it will tend to return toward its original condition after the pressure is abated, and in old devices, in order to embed the hooks deeply enough to stay properly embedded, it was necessary to apply such pressure that the portions between the hooks would be extruded into engagement with and compressed between the faces of the jaws. In the present invention, pressure of the jaws directly against the belt is avoided, and it is possible to properly seat the hooks with the use of much less pressure than formerly.

The upper edges of the fingers 17 of the magazine are arched as at 21 to conform generally to the path of movement of the bars 13, for the reasons hereinbefore noted.

The jaw supporting yokes B include the end arms 22 and 23 connected by integral bridge members 24, which are extended laterally to form supporting wings 25. The hook seating jaws A are hung between the arms of their respective supporting yokes, pivot pins 26 being extended through the arms and threaded or otherwise secured in the ends of the jaws A. The lower portions of the arms 23 are offset outwardly (as at 29) to accommodate the thickness of the arms 22.

The arms 22 and 23 are pivoted together by headed pivot pins 27, extended through both arms and threaded or otherwise secured in the ends of the magazine bar 15. The pins 27 project sufficiently so that the coils 28 of the springs E may be received between the heads of the pins and the arms 23. The upper ends of the arms 30 of the springs E are bent transversely parallel to the axis of the loop 28 as at 31 and thence hooked behind the arms 22, 23 as at 32. The arms 30 are arranged to exert diverging pressure against the arms 22, 23. The axes of the pivots 26 are near the upper extremities of the hook seating jaws A, and the upper rear corners of the jaws A are bevelled or rounded as at 33, so that the initial lines of contact between the vertical faces of a pair of vise jaws 35 and the hook seating jaws A lie in a horizontal plane hereinafter termed "plane of contact" represented by the line 34, which plane is substantially below the plane of the pivots 26 represented by the line 36. Thus the hook seating jaws will tend to swing toward each other in their lower regions, and pressure will initially be exerted against the hooks 12 at the plane of the lower inner corners of the jaws A, near the bends 14 of the hooks. The jaws A will assume positions conforming to the divergent angle of the hooks, as pressure is applied, and pressure will be centered in the plane of contact. As the jaws A approach each other, continuing to conform to the angle of the hooks, they will gradually swing toward the perpendicular, and the plane of contact will move toward the plane of the pivots 26 because of the swinging of the bevelled face 33 upwardly relative to the pivots 26.

The result of the relatively upward movement of the plane of contact will be a shifting of the center of pressure toward the points 37 of the hooks, producing, in effect, a rolling movement, wherein the pressure gradually shifts from near the bends 14 of the hooks toward the points 37. In old devices, wherein the pressure was initially applied near the points of the hooks, there was a tendency for the hooks to buckle so as to be somewhat arched in the finished lacing, instead of perfectly straight as they should be. With the rolling movement achieved in our lacer, proper closing of the bends 14 is assured by the initial concentration of pressure near said bends, and pressure near the points is reserved for clinching said points in the finishing part of operation, the intermediate rolling movement assuring the perfect flattening of the hooks in the belt.

During closing movement, the magazine C moves downwardly to correspond with the lengthening of the distance between the plane of the pivots 26 and the axis of the rod 19. Some pull will be exerted against the bends 14, aiding in the proper deformation of the hooks.

The centering and limiting mechanism D comprises guide arms 38, hung from the pivots 26, brackets including bottom flanges 39 secured at 40 to the lower face of the bar 15 and spaced upstanding flanges 41 positioned on either side of the magazine, and pins 42 secured in the flanges 41 and slidable in slots 43 in the lower ends of the guide arms 38. Engagement of the pins 42 against the upper ends of the slots 43 serves to limit spreading movement of the arms 22, 23, and to center the magazine when the device is in open position. Engagement of the pins against the lower ends of the slots 43 limits closing movement of the arms 22, 23 and again centers the magazine at the termination of the operating movement, so as to draw the loops formed by the bends into exact axial intersection of the medial plane of the belt (half way between the faces thereof). The operation in detail is as follows: Assuming a belt M to have been placed between the clips 12, the vise jaws 35 are moved toward each other, causing the lacer jaws A to approach each other, and thus giving a lazy tong movement to the arms 22, 23, the pivots 26, 26 approaching each other and the pivots 27, 27, moving vertically downwardly relative to the lower ends of arms 38, 38 which cannot move downwardly any appreciable distance because they are suspended from a fixed line and held against swinging, by pins 42, 42. The magazine C is free to tilt during this downward movement, being simply suspended from the arms 22, 23, on the pivots 27, 27. But the downward movement of the pivots 27, 27 carries the pivots 42, 42 correspondingly downwardly, until one of them is stopped by engagement with the lower extremity of the slot 43 in its respective arm 38. At this point, if the other pin 42 has not yet been stopped by its arm 38, the further downward movement of the pivots 27, 27 will cause the magazine to tilt around the axis of the pin 42 which has been stopped, until the other pin 42 has engaged the lower extremity of its slot 43, at which position the magazine will be exactly centered relative to the pivots 26, 26. No further downward movement of the magazine will thence be possible, the arms 38 holding the magazine at a fixed distance (insofar as downward movement is concerned) from the pivots 26, 26. Since the pivots 27, 27 are thus held against further downward movement, and since, as has already been shown, the approaching of the pivots 26 toward each other is conditioned upon downward movement of the pivots 27, 27 relative to the lower ends of the arms 38, 38, then it necessarily follows that the pivots 26 can move no closer to each other.

Initial conformation of the jaws A to the angle of the hooks is facilitated by their free suspension in the yokes B, the weight of the device suspended from the wings 25 having no tendency to rotate the jaws A.

The bridge members 24 serve not only to form sturdy supporting yokes, but also to limit swinging movement of the jaws A. The upper face of each jaw is adapted to contact its respective bridge member in either of two positions of displacement from an intermediate position.

It will be apparent that any of the conventional devices for holding the hooks between the closing jaws, may be employed in combination with my novel serrated closing jaws, for positioning the hooks in registry with the teeth thereof. For example, the magazine 15 may cooperate with the clip bars 13 in holding the hooks in proper position; or the magazine may be the sole means for holding a series of loose hooks, not clipped together; or the clip bars 13 may be the sole means of holding the individual hooks, the ends of the clip being held by suitable holding devices associated with the closing mechanism.

The jaws A are pivoted on axes above the plane of contact, so that the pressure of the vise jaws may operate to urge the lower regions of the jaws A toward each other, thus insuring the initial application of pressure to the lower regions of the hooks, and the gradual distribution of the pressure upwardly as the jaws are closed, as above described.

We claim as our invention:

1. In a belt lacer, a pair of opposed hook seating jaws provided in their working faces with a plurality of spaced parallel channelled depressions forming spaced parallel hook engaging teeth, and a magazine provided with a plurality of hook receiving slots arranged in planes registering with the planes of respective opposed pairs of said teeth so as to position a series of hooks supported by said magazine for engagement by the working faces of said teeth.

2. In a belt lacer, a hook seating jaw provided in its working face with a plurality of spaced parallel channelled depressions forming spaced parallel hook engaging teeth, and means for holding a series of belt lacing hooks in planes registering with the planes of the respective teeth so as to position said hooks for engagement by the working faces of said teeth.

3. In a belt lacer of the vise operated type, a pair of opposed yokes each including a longitudinal part adapted to rest upon a nose of a vise jaw and rigidly associated depending end arms pivoted to the respective end arms of the opposed yoke, and hook seating jaws pivoted at their respective ends to said end arms for swinging movement around axes parallel to said longitudinal parts.

4. In a belt lacer, a pair of opposed yokes each including a bridge member provided at its ends with depending integral end arms pivoted to the respective end arms of the opposed yoke, and hook seating jaws pivoted at their respective ends to said end arms for swinging movement around axes parallel to said bridge member.

5. In a belt lacer, a pair of opposed yokes each including a bridge member provided at its ends with depending rigidly associated end arms pivoted to the respective end arms of the opposed yoke, and hook seating jaws pivoted at their respective ends to said end arms for swinging movement around axes parallel to said bridge member, the upper face of a respective jaw being spaced from its bridge member just sufficiently to contact said bridge member in either of two positions of limited displacement of the jaw on either side of an intermediate position.

6. In a belt lacer, a pair of opposed yokes each including a bridge member provided at its ends with depending rigidly associated end arms pivoted to the respective end arms of the opposed yoke, and hook seating jaws pivoted at their respective ends to said end arms for swinging movement around axes parallel to said bridge member, each jaw being arranged to contact its respective bridge member to limit its swinging movement.

7. In a belt lacer, two opposed pairs of end arms, pivot elements pivoting the arms of one end to the corresponding arms of the opposed pair, a pair of opposed hook seating jaws each arranged between the arms of a respective pair and pivoted thereto at its ends, and a spring coiled around one of said pivot elements and extended to form opposed divergently acting spring arms the ends of which are hooked around the opposed edges of the adjacent end arms.

8. In a belt lacer of the vise operated type, opposed jaw supporting members, hook seating jaws swingingly mounted on said members for movement around parallel longitudinal axes disposed above the geometrical centers of said jaws, and means for supporting said device between the jaws of a vise, the upper outer corners of said jaws being cut away so that the line of contact between said vise jaws and the hook seating jaws will be below the axes of swinging movement of the latter.

9. In a belt lacer, two opposed pairs of end arms, the arms of one pair being pivoted to the corresponding arms of the opposed pair, and a pair of opposed hook seating jaws each arranged between the arms of a respective pair and pivoted thereto at its ends, a magazine supported between said end arms and below the jaws, a hook retaining rod extended longitudinally through said magazine and projecting at one end thereof, said end arms being bowed outwardly in a direction transverse to the axis of said magazine to accommodate between them said projecting rod end.

10. In a belt lacer, a pair of hook seating jaws provided in their working faces with a plurality of spaced parallel channelled depressions forming spaced parallel hook engaging teeth, and means for holding a series of belt lacing hooks in planes registering with the planes of the respective opposed pairs of said teeth so as to position said hooks for engagement by the working faces of said teeth.

11. In a belt lacer, a pair of opposed yokes each including a bridge member provided at its ends with depending rigidly associated end arms pivoted to the respective end arms of the opposed yoke, and hook seating jaws pivoted at their respective ends to said end arms for swinging movement around axes parallel to said bridge member.

12. In a belt lacer, a pair of opposed yokes each including a bridge member provided at its ends with depending rigidly associated end arms pivoted to the respective end arms of the opposed yoke, and hook seating jaws pivoted at their respective ends to said end arms for swinging movement around axes parallel to said bridge member, said bridge member including means projecting beyond the outer sides of the jaws and adapted to rest upon the jaws of a vise while said hook seating jaws are engaged between the vise jaws.

ORVILLE B. BRIGGS.
ALBERT L. LAMB.